(12) United States Patent
Stankovic (10) Patent No.: US 10,730,199 B2
(45) Date of Patent: Aug. 4, 2020

(54) CIRCULAR SAW GUIDE AND METHOD OF USE

(71) Applicant: Marko Stankovic, Houston, TX (US)

(72) Inventor: Marko Stankovic, Houston, TX (US)

( * ) Notice: Subject to any disclaimer, the term of this patent is extended or adjusted under 35 U.S.C. 154(b) by 0 days.

(21) Appl. No.: 15/611,523

(22) Filed: Jun. 1, 2017

(65) Prior Publication Data

US 2017/0355095 A1    Dec. 14, 2017

Related U.S. Application Data

(60) Provisional application No. 62/347,320, filed on Jun. 8, 2016.

(51) Int. Cl.
*B27B 9/04*     (2006.01)
*B27G 5/02*     (2006.01)
*B23D 47/04*    (2006.01)
*B23D 47/02*    (2006.01)

(52) U.S. Cl.
CPC ............... *B27B 9/04* (2013.01); *B23D 47/02* (2013.01); *B23D 47/04* (2013.01); *B27G 5/02* (2013.01)

(58) Field of Classification Search
CPC .......... B23D 47/02; B23D 47/04; B27G 5/02; B27B 9/04
USPC ......................................... 83/829, 56, 464.4
See application file for complete search history.

(56) References Cited

U.S. PATENT DOCUMENTS

| | | | | |
|---|---|---|---|---|
| 2,595,322 A | * | 5/1952 | Avery ................ | B23Q 9/0085 83/471.3 |
| D166,991 S | * | 6/1952 | Ovandale ................ | D6/691.1 |
| 2,941,554 A | * | 6/1960 | Long ................ | B23Q 9/0085 83/486.1 |
| D236,054 S | * | 7/1975 | Ginat ................ | D6/677.1 |
| 3,991,643 A | * | 11/1976 | Girardin ................ | B23Q 1/26 83/564 |
| 4,133,237 A | * | 1/1979 | Lewin ................ | B23D 47/025 83/468.3 |
| 4,181,057 A | * | 1/1980 | Bassett ................ | B23Q 9/0085 83/471.3 |
| 4,213,364 A | * | 7/1980 | Sahlin ................ | B23Q 9/0092 83/471.3 |
| 4,275,666 A | * | 6/1981 | Schriever ............ | A47B 87/0246 108/101 |
| 4,327,619 A | * | 5/1982 | McNamee, Jr. ... | B23D 57/0092 83/468.3 |

(Continued)

*Primary Examiner* — Ghassem Alie
*Assistant Examiner* — Bharat C Patel
(74) *Attorney, Agent, or Firm* — Egbert, McDaniel & Schwartz, PLLC (57) ABSTRACT

A circular saw guide is provided having an upper frame member with a plurality of angular indicia on an edge thereof. A lower frame member is pivotable relative to said the frame member. The upper surface of the lower frame member is adapted to receive a workpiece to be cut thereon. A pivot member is provided for selectively preventing or allowing pivoting of the lower frame member relative to the upper frame member. The upper surface of the upper frame member is adapted to guide the footplate of the circular saw. By pivoting the lower frame member relative to the upper frame member, the edge of the workpiece can be aligned with a desired indicia, which is indicative of the angle that the board will be cut. A method of cutting a workpiece at a desired angle is also disclosed.

11 Claims, 7 Drawing Sheets

(56) References Cited

U.S. PATENT DOCUMENTS

| | | | | |
|---|---|---|---|---|
| 4,448,102 A * | 5/1984 | Thornton | B23D 45/146 | 83/471.1 |
| 4,527,605 A * | 7/1985 | Ede | B25H 1/10 | 144/136.95 |
| 4,840,097 A * | 6/1989 | Campbell | B23Q 9/0085 | 83/471.3 |
| 5,067,535 A * | 11/1991 | Wolff | B23D 47/025 | 144/1.1 |
| 5,271,159 A * | 12/1993 | Chen | B23Q 9/005 | 33/403 |
| 5,427,006 A * | 6/1995 | Finley | B23Q 9/0085 | 83/468.5 |
| 5,577,428 A * | 11/1996 | Rueb | B23D 47/02 | 144/286.5 |
| 5,577,429 A * | 11/1996 | Noble | B23D 45/024 | 83/468.4 |
| 5,651,298 A * | 7/1997 | Break | B23D 47/025 | 83/471.3 |
| 6,401,584 B1 * | 6/2002 | Rowe | G01B 3/56 | 33/452 |
| 6,550,402 B1 * | 4/2003 | Stone | A47B 7/02 | 108/91 |
| 6,752,059 B1 * | 6/2004 | Posont | B23Q 9/005 | 33/499 |
| 6,990,882 B2 * | 1/2006 | Schonfelder | B23D 47/02 | 83/467.1 |
| 6,997,114 B2 * | 2/2006 | Chang | A47B 17/06 | 108/64 |
| 7,159,498 B2 | 1/2007 | Stewart | | |
| 7,249,548 B2 * | 7/2007 | Blanco | B23D 45/025 | 269/266 |
| 7,373,732 B2 | 5/2008 | Baida | | |
| 8,201,483 B2 | 6/2012 | Wilson | | |
| 8,752,459 B1 * | 6/2014 | Koresh | B27B 9/04 | 83/13 |
| 2003/0145706 A1 | 8/2003 | Jordan | | |
| 2003/0213415 A1 * | 11/2003 | Ross | A47B 21/00 | 108/50.02 |
| 2004/0163520 A1 * | 8/2004 | Nurenberg | B23D 45/024 | 83/471.3 |
| 2009/0199686 A1 * | 8/2009 | Grachal | B23D 47/04 | 83/13 |
| 2010/0024621 A1 * | 2/2010 | Van Cleave | B23D 47/02 | 83/471.2 |
| 2011/0226104 A1 * | 9/2011 | Chase | B23Q 9/005 | 83/56 |
| 2013/0283993 A1 | 10/2013 | Holladay | | |
| 2015/0047484 A1 | 2/2015 | Lane | | |

\* cited by examiner

CIRCULAR SAW GUIDE AND METHOD OF USE

RELATED U.S. APPLICATIONS

The present application claims priority from Provisional Patent Application No. 62/347,320, filed on Jun. 8, 2016, and entitled "Circular Saw Guide".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to carpentry tools. More particularly, the present invention relates to a guide for cutting angles with a circular saw.

2. Description of Related Art Including Information Disclosed Under 37 CFR 1.97 and 37 CFR 1.98

A frequent task for a carpenter is to lay out angles on a workpiece such as a board and then to cut the piece along that angle. Laying out and marking the angles can be a very time-consuming process that may require several steps. For instance, a carpenter may use a speed square or other angle-measuring device and then mark the angle with a pencil. Then the workpiece is taken to a saw or the saw, such as a circular saw, is brought to the workpiece where a cut is made. Of course, the accuracy of the cut is dependent upon the accuracy of the angle measurement and marking, as well as the carpenter's expertise.

Miter saws, or compound saws, have been the common type of equipment used in the field of trim carpentry. However, there are several disadvantages in using a miter saw. First of all, miter saws are very expensive and are prone to be stolen or damaged at a construction site. Second, they are difficult to transport given their bulky size and relatively heavy weight.

While many homeowners own a circular saw, cutting angles on workpieces can prove difficult without a miter or compound saw. However, as discussed above, miter or compound saws are very expensive and will often go unused by the homeowner after the initial purchase and use on the project at hand.

Miter boxes offer one possible solution for the budget-minded homeowner. However, conventional miter boxes use handheld saws, the use of which is more burdensome and time-consuming than the use of a circular saw.

Various patents have issued and have been applied for in the past related to cutting angles with a circular saw. For example, U.S. Pat. No. 7,373,732, issued on May 20, 2008 to Baida, describes an attachable guide for circular saw. The guide for attachment to a circular saw includes an attaching member, an extension member for slidable movement in a slot defined longitudinally along the attaching member, and an angle guide attached to the extension member. The attaching member is attachable to a circular saw rip guide and includes primary and rear portions for abutting a workpiece. The angle guide may be set to a desired angle and locked into place. With the angle guide pressed against the workpiece, the circular saw may be activated. As the saw and attached guide move forward along a cut path, the extension member and angle gauge remain abutted against the workpiece through relative slidable movement between the attaching and extension members. A ball catch mechanism may be included to selectively prevent the attaching and extension members from completely separating. A laser light may also be included to illuminate the line to be cut.

Patent Publication No. 2015/0047484, published on Feb. 19, 2015 to Lane, describes a similar saw cutting guide. The saw cutting guide includes a main baseplate having a top side and an under side, and featuring a guide track on the top side, for receiving and guiding a power cutting tool, and a pivotally mounted alignment fence on the underside for selectively aligning the work piece in relation to the guide track.

U.S. Pat. No. 5,271,159, issued on Dec. 21, 1993 to Chen et al., teaches another similar circular saw guide. The mitering guide device has a protractor including a curved edge with angle markings thereon. An arm is pivotally attached to the protractor and performs in conjunction with a saw guide for defining an angle to be cut. A hinge is attached to the protractor and saw guide through multiple hinge joints for permitting various thicknesses of boards to be cut.

U.S. Patent Publication No. 2013/0283993, published on Oct. 31, 2013 to Holladay, teaches the portable adjustable saw guide. The device consists of an edge-of-board follower rail, a support arm, and a pivotally adjustable saw fence. Externally affixed to the saw fence are a horizontal cut locator arm and a saw stop tab. The locator arm has a cut alignment tang and a saw blade recess slot. The saw stop tab has a thumbscrew type adjuster. The device is positioned by the alignment tang, which drops into a previous cut. During operation the saw foot overruns the cut locator arm and is stopped by the tab. Thumbscrew type adjusters are located at each end of the follower rail to allow for variation in depth of the perpendicular notch. Various angular scales are marked on the upper surface of the follower rail to aid in saw fence setup.

U.S. Pat. No. 8,201,483, issued on Jun. 19, 2012 to Wilson, describes a circular saw miter guide. Operating a circular saw between a pair of parallel guide rails, which engage opposing sides of saw base plate to constrain the motion of the saw to a straight path, allows for precise cuts. A set of two or more fences allows for multiple cutting options. Non-parallel fences coupled to the guide rails allow for precise cuts at more than just a single angle. Two fences may engage opposing sides of the object to be cut simultaneously, holding the object more securely with respect to the guide rails than would a single fence. A possible clamping force holding the two fences against the object allows the miter guide to remain fixed relative to the object so that the user's hand may be freed for another task, such as holding the saw with both hands.

U.S. Patent Publication No. 2003/0145706, published on Aug. 7, 2003 to Jordan, teaches a guide for a circular saw. The guide has a platform, a front, a rear support and a bottom plate secured to the platform and a removable base secured to the assembly through an attachment means. The platform contains a pair of adjustable parallel guides for receiving the power tool and a blade gap allowing the power tool to contact a workpiece. The assembly is designed such that the blade of the circular saw contacts and penetrates the base without damage to the saw or the assembly, obviating the need for adjustment of the assembly before use.

U.S. Pat. No. 7,159,498, issued on Jan. 9, 2007 to Stewart, describes the miter box for use with a circular saw. The miter box facilitates several conventional workpiece trim cuts using a handheld circular saw, including 45 degree and 90 degree straightcuts, as well as 45 and 90 degree straightcuts with a 45 degree undercut. An I-beam is formed from a rigid base plate having opposing first and second base plate edges disposed along its elongated length. A first and second flange can be respectively attached to the opposing first and second base plate edges. Each of the flanges can include a pair of opposing support faces. One or more transverse guide members can extend either 45, 135, or 90 degrees from one support face of the first flange to another support face of the second flange. The transverse guide member(s) and the support faces provide a friction reduced medium.

It is an object of the present invention to provide an angle cutting guide for use with circular saws.

It is another object of the present invention to provide a circular saw cutting guide which facilitates miter cuts from 0 to 60° and bevel cuts from 0 to 45°.

It is another object of the present invention to provide a circular saw gutting guide which is safer to use than prior art methods.

It is yet another object of the present invention provide a circular saw cutting guide which is portable and lightweight.

It is yet another object of the present invention to provide a circular saw cutting guide which is easy to use.

It is another object of the present invention to provide a circular saw cutting guide which takes the place of more expensive compound or miter saws.

It is another object of the present invention to provide a circular saw cutting guide which can be used on almost any surface.

It is yet another object of the present invention provide a circular saw cutting guide which ensures a proper cut regardless of the size of the workpiece.

It is another object of the present invention provide a circular saw cutting guide which does not require two guides or edges for the saw.

These and other objects and advantages of the present invention will become apparent from a reading of the attached specification and appended claims.

BRIEF SUMMARY OF THE INVENTION

In an embodiment, the present invention is a circular saw guide having n upper frame member with a plurality of indicia on an edge thereof. A lower frame member is pivotable relative to the upper frame member and has an upper surface thereon adapted to receive a workpiece to be cut thereon. A pivot member is provided which is suitable for selectively preventing or allowing the lower frame member to pivot relative to the upper frame member. In an embodiment of the present invention, the upper frame member has an upper surface adapted to guide a footplate of a circular saw. Preferably, the lower frame member is pivotable so as to be positioned below and in line with the upper frame member.

The upper surface of the lower frame member preferably has a vertical edge extending above the upper surface of the lower frame member. The vertical edge is adapted to abut an edge of the workpiece to be cut.

Each of the upper frame member and the lower frame member preferably have a plurality of legs. Preferably, the pivot member comprises one leg of the plurality of legs of the upper frame member. The one leg extends between the upper frame member and the lower frame member. The pivot member preferably also includes a locking mechanism positioned on a top of the one leg of the plurality of legs of the upper frame member. The locking mechanism preferably is a screw.

In the present invention, the plurality of indicia are preferably a plurality of angular values.

In the present invention, an opening is provided which is defined by the upper surface of the lower frame member and a lower surface of the upper frame member. The opening is adapted for the workpiece to extend therethrough.

In an embodiment of the present invention, a spacer is removably positioned on the upper surface of the lower frame member. The spacer is provided so as to raise the workpiece relative to the lower frame member.

The present invention is also a guide for cutting angles on a workpiece with a circular saw wherein the workpiece has an edge. The guide preferably includes an upper frame member having a plurality of indicia on a side thereof. The upper frame member has an upper surface and a lower surface thereon. A lower frame member is provided having an upper surface thereon suitable for placement of the workpiece. The lower frame member is pivotable from a first position relative to the upper frame member to a second position relative to the upper frame member. A passageway is formed between the upper surface of the lower frame member and the lower surface of the upper frame member. The passageway is adapted for positioning the workpiece. The edge of the workpiece is arranged so as to be in alignment with a first indicia of the plurality of indicia when the lower frame member is in the first position relative to the upper frame member. The edge of the workpiece is arranged so as to be in alignment with a second indicia of the plurality of indicia when the lower frame member is in the second position relative to the upper frame member.

The present invention is also a method of cutting a workpiece at a desired angle, the method comprising: providing a guide having a lower frame member pivotable relative to an upper frame member, the upper frame member having a plurality of angular indicia marked thereon; placing the workpiece on the lower frame member such that the workpiece extends under and past the upper frame member, an edge of the workpiece being in alignment with a first angular indicia of the plurality of angular indicia; pivoting the lower frame member relative to the upper frame member such that the edge of the workpiece is in alignment with a desired second angular indicia; and cutting the workpiece with a circular saw, a footplate of the circular saw being positioned on an upper surface of the upper frame member.

In the method of the present invention, the guide may have a pivot member with a locking mechanism thereon, in which the step of pivoting comprises: unlocking the locking mechanism so as to allow the lower frame member to pivot relative to the upper frame member; pivoting the lower frame member relative to the upper frame member; and locking the locking mechanism.

The method of the present invention may also include the step of: raising the workpiece relative to the lower frame member by placing a spacer on the upper surface of the lower frame member.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
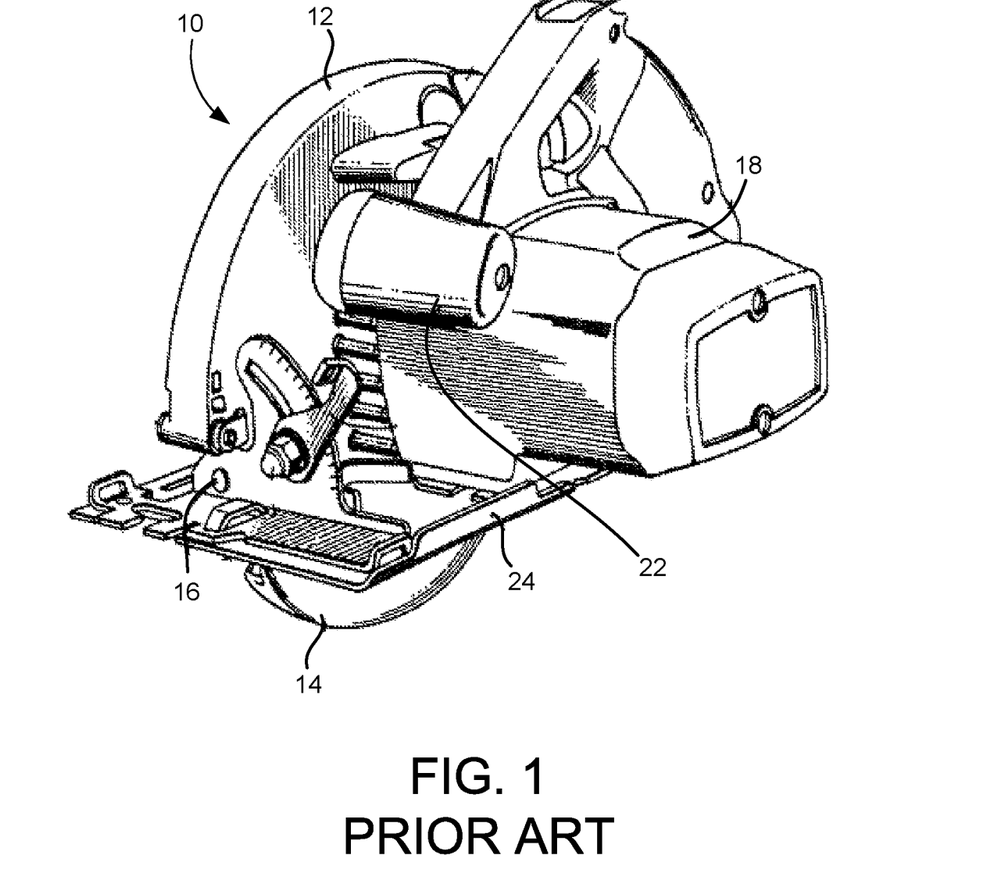
FIG. 1 is a perspective view of a prior art circular saw to be used with the circular saw guide of the present invention.

Referring to FIG. 1, there shown a perspective view of a prior art circular saw 10, as may be used with the circular saw guide of the present invention. The circular saw 10 has an upper guard 12 and a lower guard 14 surrounding a blade 16. The blade 16 is driven by encased motor 18. Handles 20 and 22 allow the user to guide and activate the circular saw 10. A footplate 24 helps guide the circular saw along the workpiece that is being cut. The footplate 24 importantly has a flat lower surface. The motor 18 of the circular saw 10 is by far the heaviest portion of the circular saw 10. Thus, the center of gravity of the circular saw 10 is located in the area of the motor 18.

Figure 2:
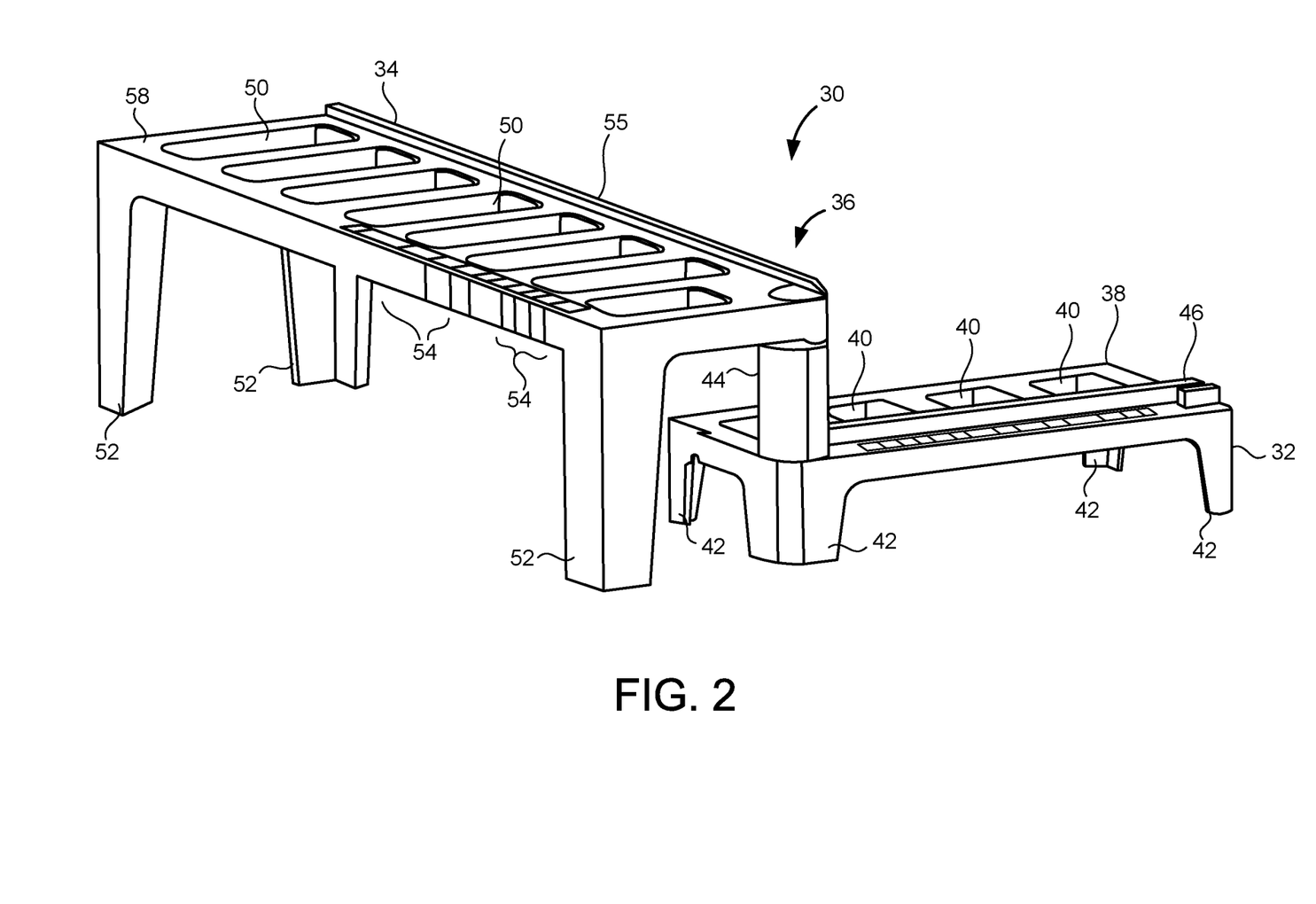
FIG. 2 is a perspective view of the circular saw guide of the present invention.

Referring to FIG. 2, there shown a perspective view of the circular saw guide 30 of the preferred embodiment of the present invention. In FIG. 2, it can be seen how the circular saw guide 30 has a lower frame member 32 and an upper frame member 34. The lower frame member 32 is pivotable about a pivot 36 relative to the upper frame member 34.

The lower frame member 32 has an upper surface 38, which is suitable for placement of a workpiece which the user wants to cut. A plurality of openings 40 are preferably formed through the lower frame member 32, which lessen the weight and increase the portability of the circular saw guide 30 of the present invention. A plurality of legs 42 are shown as supporting the lower frame member 32 above the surface therebelow. One of the legs 42 is positioned below a pivot member 44.

The lower frame member 32 preferably has a vertical edge or guide 46 along one end thereof. As will be shown in subsequent figures, an edge of the workpiece abuts the vertical edge or guide 46.

Similarly, the upper frame member 34 has an upper surface 48. The upper surface 48 is suitable for the footplate 24 of the circular saw 10 to be guided upon. As was the case of the lower frame member 32, the upper frame member 34 preferably has a plurality of openings 50 formed therethrough. A plurality of legs 52 are shown as supporting the upper frame member relative to the surface below and relative to the lower frame member 32.

A vertical edge or guide 55 is shown on the upper surface 48 of the upper frame member 34. The vertical edge 55 is suitable for abutting against a side of the footplate 24 of the circular saw 10.

Importantly, in FIG. 2, it can be seen how there are plurality of indicia 54 marked or formed on the side of the upper frame member 34. The plurality of indicia 54 show the desired cut angles for the circular saw cutting guide 30 of the present invention. Preferably, the cutting angles range from 0° (i.e., the rightmost indicia 54) to 60° (i.e. the leftmost indicia 54). By pivoting or rotating the lower frame member 32 relative to the upper frame member 34, the user can select, based on the indicia 54, which angle he or she desires to cut the workpiece. This process will be shown in subsequent figures. In addition to miter cuts, the circular saw cutting guide 30 facilitates bevel cuts from 0 to 45°.

Figure 3:
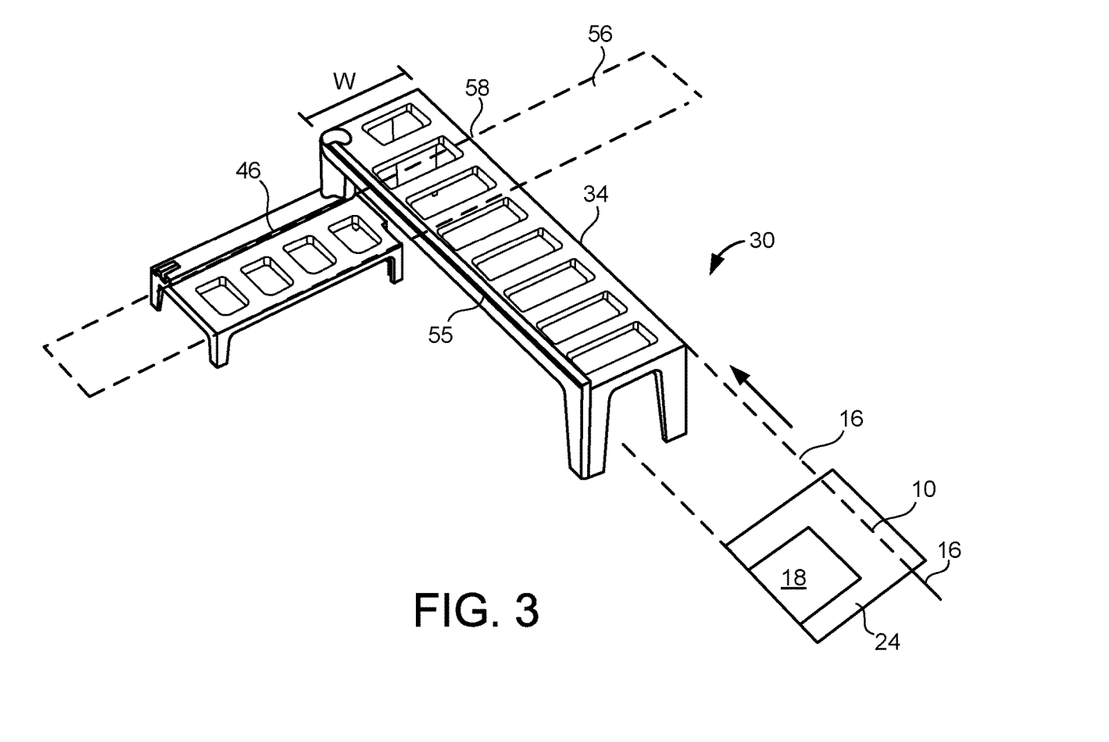
FIG. 3 is another perspective view of the circular saw guide of the present invention showing a workpiece being cut at a first angle.

FIG. 3 shows an upper perspective view of the circular saw cutting guide 30 of the present invention, wherein a workpiece is positioned thereon. The workpiece 56 is illustrated in broken lines. In FIG. 3, it can be seen how the lower frame member 32 is at an angle of essentially 90° relative to the upper frame member 34. As such, when the workpiece 56 is positioned on the lower frame member 32, and extends through and outwardly from the upper frame member 34, the edge of the workpiece 56 along the plane of the vertical edge 46 of the lower frame member 32 is at a first indicia 58 of the plurality of indicia 54. In this case, the first indicia 58 would indicate a 0° cut. As can be seen in FIG. 3, the workpiece 56 is held in place relative to the lower frame member 32 by being pushed against the vertical edge or guide 46.

FIG. 3 also shows how the circular saw 10 is used to cut the workpiece 56. In FIG. 3, it can be seen how the leftmost edge of the footplate 24 of the circular saw 10 is positioned against the vertical edge or guide 55 of the upper frame member 34. The motor 18 and center of gravity of the circular saw 10 is thus positioned over the upper surface of the upper frame member 34. The blade 16 of the circular saw 10 moves along the edge of the upper frame member 34 opposite the vertical edge or guide 55, until it encounters the workpiece 56 and the cut is made. Circular saws of the prior art and those that are commercially available are generally of a similar size. The width W as shown in FIG. 3 is dictated by the width of the circular saw 10. The circular saw guide 30 utilizes the center of gravity of the circular saw 10 such that the upper frame member 34 supports the weight of the circular saw 10 and a guide for the opposite side of the circular saw 10 (adjacent the blade) is not necessary.

Figure 4:
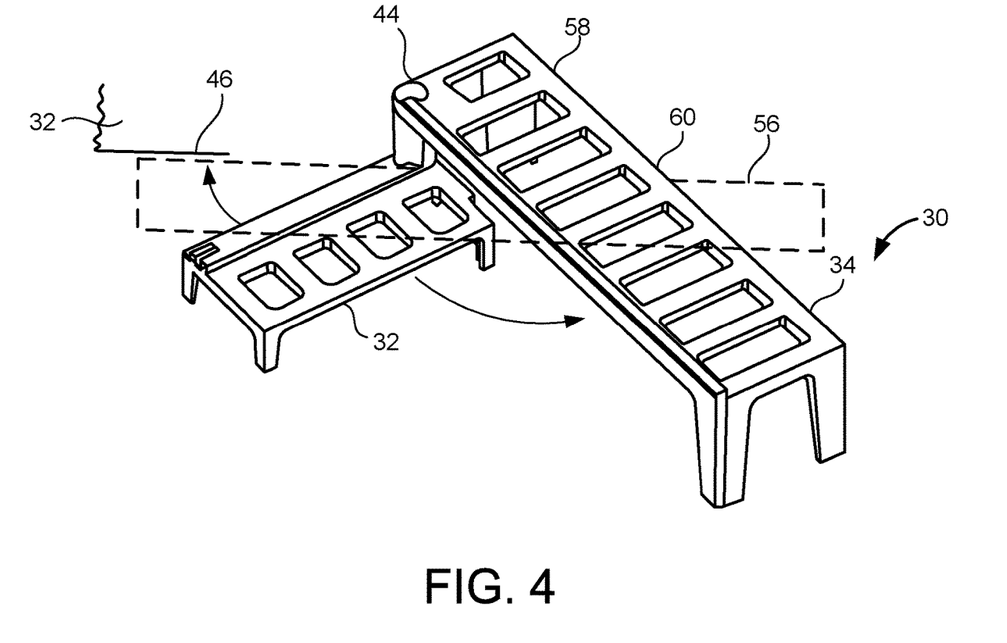
FIG. 4 is another perspective view of the circular saw guide of the present invention wherein the workpiece being cut at a second angle.

FIG. 4 illustrates the circular saw guide 10 wherein the lower frame member 32 can be pivoted relative to the upper frame member 34. When the lower frame member 32 is pivoted or rotated outwardly relative to the upper frame member 34, a workpiece 56 positioned on the lower frame member 32 is at an angle relative to the upper frame member 34. In FIG. 4, it can be seen how the edge of the workpiece 56 which abuts the vertical edge 46 of the lower frame member 32 is now at a second indicia 60 of the plurality of indicia 54. The angle of the cut shown in FIG. 4 is approximately 45°.

When the user decides to make a 45° cut, the pivot member 44 is loosened allowing for pivoting of the lower frame member 32 relative to the upper frame member 34. The lower frame member 32 is then pivoted until the leftmost edge of the workpiece 56 intersects the desired indicia 54. The pivot member is then tightened to secure the upper frame member 34 in a position relative to the lower frame member 32, at the desired indicia. The cut can then be made in accurate and quick manner.

FIG. 4 also shows how the lower frame member 32 can that be pivoted inwardly and stowed beneath the upper frame member 34. This allows for the circular saw guide 30 of the present invention to be very portable, easy to use, and easy to store.

Figure 5:
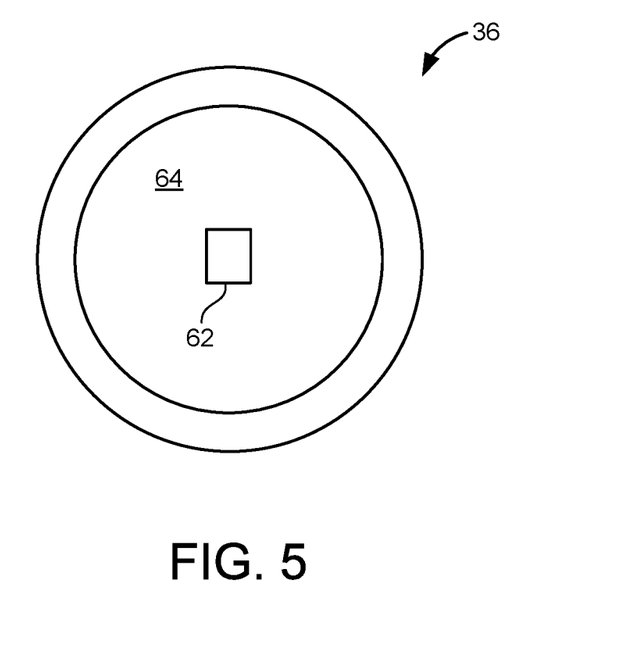
FIG. 5 shows an isolated view of the pivot member of the circular saw guide of the present invention.

FIG. 5 shows an isolated view of the pivot 36. In FIG. 5, it can be seen how the pivot 36 has a screw 62 within a recess 64. The screw 62 can be any type of screw can be easily tightened and loosened. For example, the screw 62 could be an Allen screw.

Figure 6:
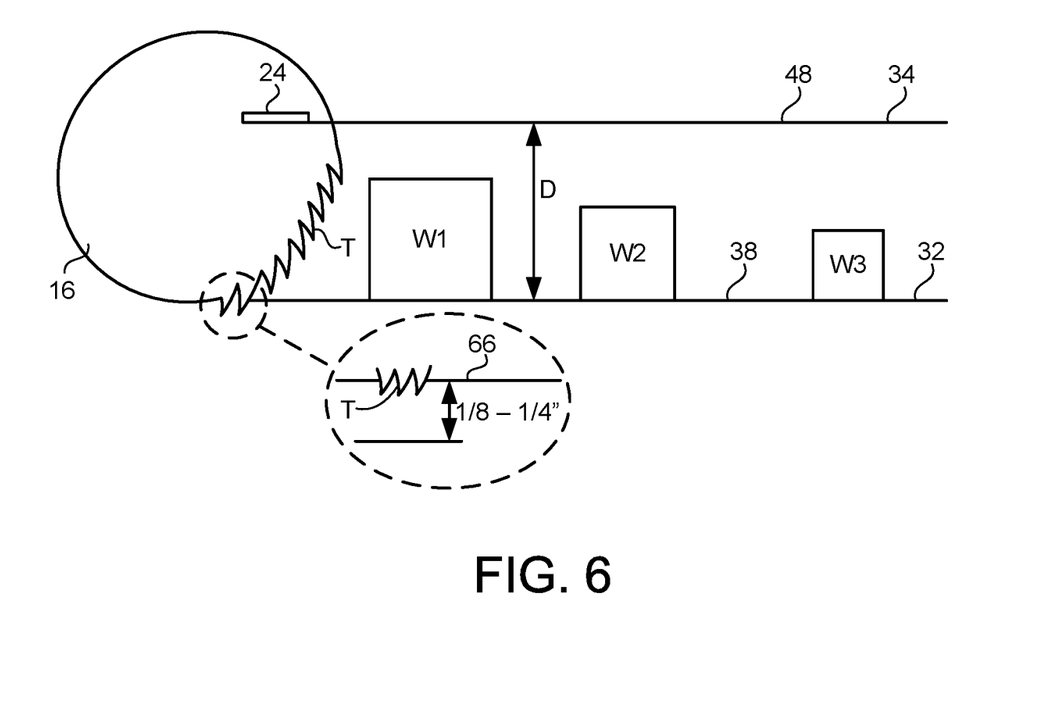
FIG. 6 is a schematic view illustrating how the blade of the circular saw cuts the various workpieces positioned on the circular saw guide of the present invention.

FIG. 6 is a schematic view illustrating how the circular saw guide 30 of the present invention ensures a clean cut regardless of the size of the workpiece. FIG. 6 shows the blade 16 of the circular saw 10. For the best and cleanest cut, ideally that the blade 16 extends between ⅛ and ¼ inch below the bottom of the workpiece. This distance is based upon the common depth of the teeth T of the blade 16. FIG. 6 shows three different sized workpieces W1, W2 and W3. As can be seen in FIG. 6, the blade 6 is held in a constant vertical position because the footplate 24 abuts the top surface 48 of the upper frame member 34. The upper frame member 34 is held a constant distance D from the lower frame member 32. Because the workpieces are positioned on the upper surface 38 of the lower frame member 32, the bottom of each of the workpiece is at a specific vertical position relative to the blade 16, regardless of the size of the workpiece. The isolated view in FIG. 6 shows the teeth T of the saw blade 16 extending between ⅛ and ¼ inch below the bottom surface 66 of the workpieces W1, W2 and W3.

FIG. 6 illustrates the ease of obtaining a quality cut as compared to prior art methods where in an angle is simply marked on the workpiece, and the workpiece is cut on a table with a circular saw. In such a case, the teeth of the circular saw would be much lower relative to the workpiece for a smaller piece of wood (for example, a 1×4 board), relative to the depth of the teeth when a large piece of wood is cut (for example, a 2×4 board).

Figure 7:
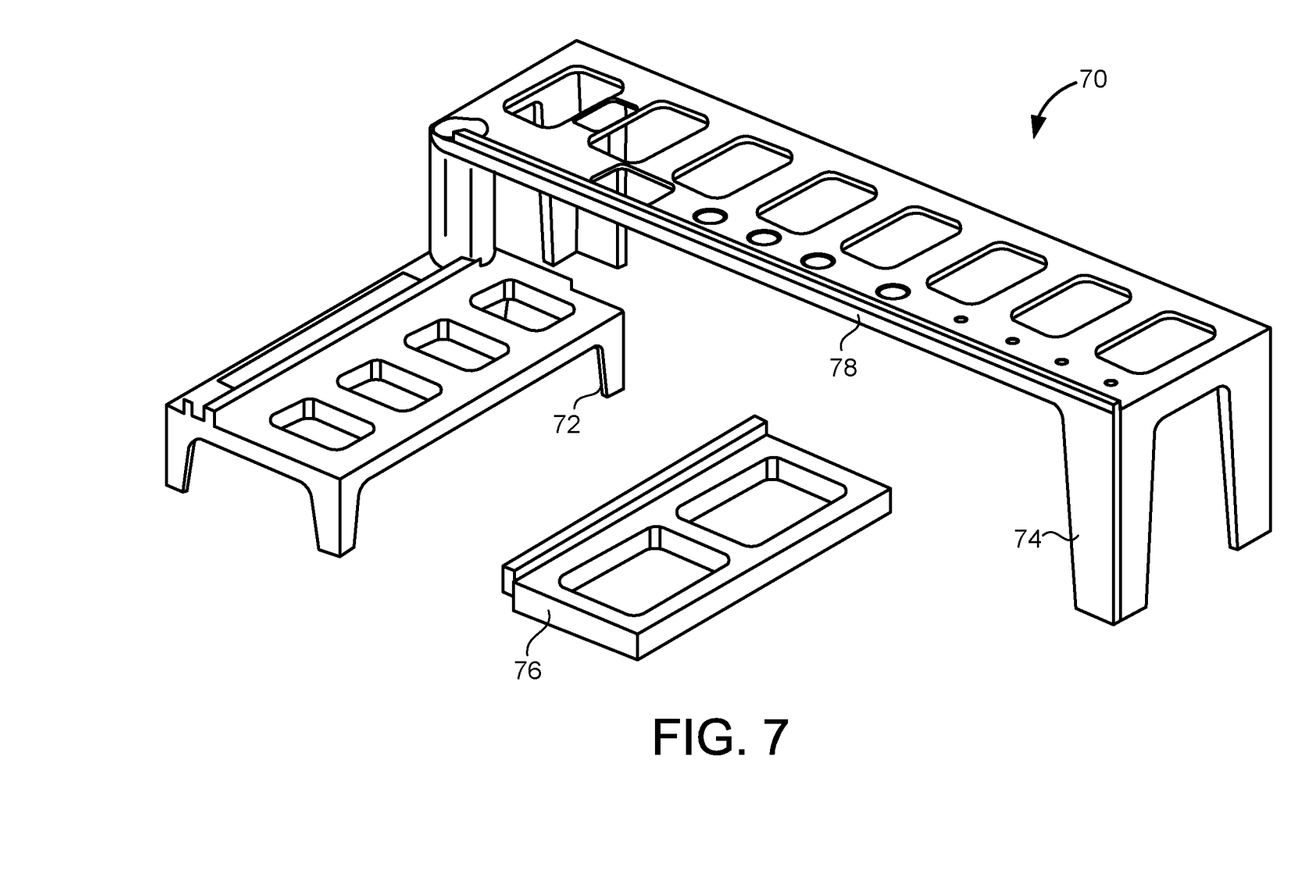
FIGS. 7 and 8 show an embodiment of the present invention wherein a spacer is provided for positioning on the lower frame member of the circular saw guide of the present invention.
Figure 8:
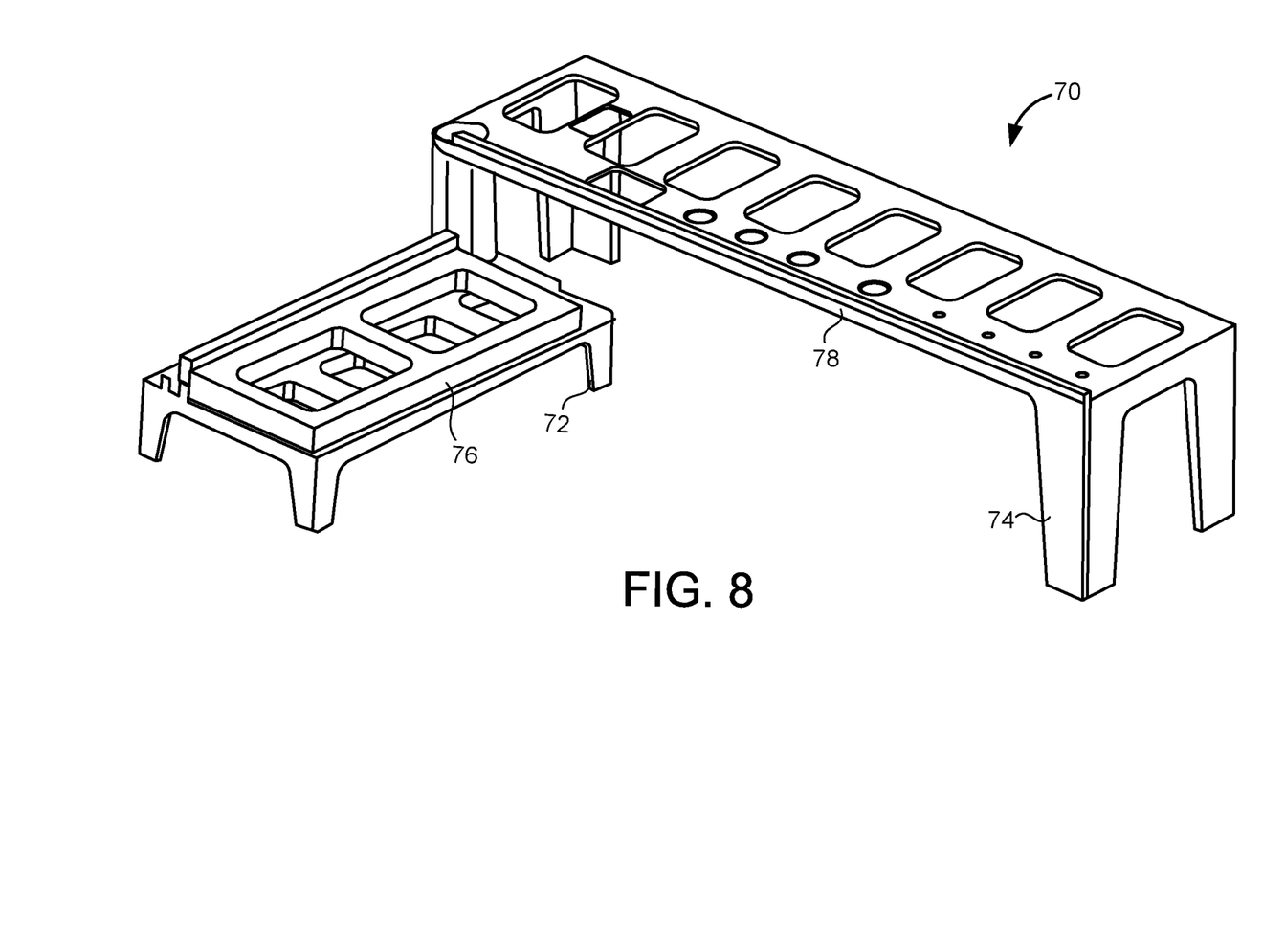

Referring to FIGS. 7 and 8, there shown an embodiment of the present invention wherein the circular saw guide 70 has an upper frame member 74 a lower frame member 72. As shown in previous embodiments, the upper frame member 74 is pivotable relative to lower frame member 72. The circular saw guide 70 as shown in FIGS. 7 and 8 operates in the same manner as the previously described embodiments.

Importantly, in FIGS. 7 and 8 it can be seen how there is a spacer 76 which is suitable for removably positioning on the lower frame member 72. FIG. 8 shows the spacer 76 positioned on the lower frame member 72. As most circular saws are able to cut to a depth of 1.875 inches while at 45°, the spacer 76 allows for positioning the wood closer to the upper frame member 74 thus allowing bevel cuts of 45° or less. The spacer 76 of the circular saw guide 70 is easily positioned and removable from the circular saw guide 70, and does not interfere with the storage of the circular saw guide 70.

In FIGS. 7 and 8, it can also be seen how the upper frame member 74 has a depth or thickness 78, which is thinner than the thickness shown in the previous embodiments. By reducing the thickness 78, the wood being cut can be positioned as close to the circular saw blade as possible. The relatively thin thickness 78 allows for more a versatile circular saw guide.

A method of cutting a workpiece at a desired angle is also disclosed. The method comprises: providing a guide having a lower frame member pivotable relative to an upper frame member, the upper frame member having a plurality of angular indicia marked thereon; placing the workpiece on the lower frame member such that the workpiece extends under and past the upper frame member, an edge of the workpiece being in alignment with a first angular indicia of the plurality of angular indicia; pivoting the lower frame member relative to the upper frame member such that the edge of the workpiece is in alignment with a desired second angular indicia; and cutting the workpiece with a circular saw, a footplate of the circular saw being positioned on an upper surface of the upper frame member. The guide in the method of the present invention may have a pivot member with a locking mechanism thereon. The step of pivoting may comprise: unlocking the locking mechanism so as to allow the lower frame member to pivot relative to the upper frame member; pivoting the lower frame member relative to the upper frame member; and locking the locking mechanism.

The method of the present invention may also include the step of: raising the workpiece relative to the lower frame member by placing a spacer on the upper surface of the lower frame member.

The circular saw cutting guide and method of the present invention is ideal for homeowners who do not wish to purchase an expensive compound or miter saw due either to the expense or the cumbersome nature of such a saw. The circular saw guide of the present invention allows the homeowner to use his or her own circular saw to make precise cuts. The circular saw guide of the present invention is also ideal for use by contractors at job sites, particularly when a contractor must visit a job site, but would rather not transport the cumbersome miter compound saw.

The circular saw cutting guide of the present invention is also safer to use as compared to prior art methods using saw horses or the cantilever technique. With the saw horse method, the blade can become pinched. In the case of the cantilever technique, the cut piece of wood can easily fall onto the foot of the person operating the saw, causing injury.

The foregoing disclosure and description of the present invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A circular saw guide for receiving a footplate of a circular saw, the circular saw guide comprising:
   an upper frame member having a plurality of indicia on an edge thereof, said plurality of indicia comprising a plurality of angular values indicative of miter cut angles made with the circular saw guide, the footplate of the circular saw being received by and movable along a guide member on an upper surface of said upper frame member;
   a lower frame member pivotable relative to said upper frame member in a horizontal plane, said lower frame member having an upper surface thereon, said upper surface of said lower frame member adapted to receive a workpiece to be cut thereon; and
   a pivot member suitable for selectively preventing or allowing said lower frame member and the workpiece to pivot relative to said upper frame member, each of said upper frame member and said lower frame member having a plurality of legs respectively positioned at each corner thereof, said pivot member comprising one leg of said plurality of legs of said upper frame member, said pivot member extending between said upper frame member and said lower frame member, said pivot member being coaxial with one of said legs of said plurality of legs of said lower frame member, wherein each of said plurality of legs of said lower frame member and each of said plurality of legs of said upper frame member excluding said pivot member extend to a ground surface below and support said upper frame member and said lower frame member above said ground surface.

2. The circular saw guide of claim 1, said upper surface of said lower frame member having a vertical edge extending above said upper surface of said lower frame member, said vertical edge adapted to abut an edge of the workpiece to be cut.

3. The circular saw guide of claim 1, said pivot member comprising:
a locking mechanism positioned on a top of said one leg of said plurality of legs of said upper frame member.

4. The circular saw guide of claim 3, said locking mechanism comprising a screw.

5. The circular saw guide of claim 1, further comprising:
an opening defined by said upper surface of said lower frame member and a lower surface of said upper frame member, said opening adapted for the workpiece to extend therethrough.

6. The circular saw guide of claim 1, further comprising:
a spacer removably positioned on said upper surface of said lower frame member, said spacer adapted to raise the workpiece relative to said lower frame member.

7. The circular saw guide of claim 1, said lower frame member pivotable so as to be positioned below and in line with said upper frame member.

8. A guide for cutting angles on a workpiece with a circular saw, the guide receiving a footplate of the circular saw, the workpiece having an edge, the guide comprising:
a upper frame member having a plurality of indicia on a side thereof, said plurality of indicia indicative of a miter cut angle of the workpiece, said upper frame member having an upper surface and a lower surface thereon, the footplate of the circular saw being received by and movable along a guide member on said upper surface of said upper frame member, said upper frame member having a plurality of legs respectively positioned at each corner thereof;
a lower frame member having an upper surface thereon, said upper surface of said lower frame member suitable for placement of the workpiece, said lower frame member pivotable in a horizontal plane from a first position relative to said upper frame member to a second position relative to said upper frame member, said upper surface of said lower frame member being a fixed vertical distance from said upper surface of said upper frame member, said lower frame member having a plurality of legs respectively positioned at each corner thereof, wherein one leg of said plurality of legs of said upper frame member is coaxial with one leg of said plurality of legs of said lower frame member, wherein each of said plurality of legs of said lower frame member and each of said plurality of legs of said upper frame member excluding said one leg of said plurality of legs of said upper frame member extends to a ground surface below and supports said upper frame member and said lower frame member above said ground surface; and
a passageway formed between said upper surface of said lower frame member and said lower surface of said upper frame member, said passageway adapted for positioning the workpiece, the edge of the workpiece being in alignment with a first indicia of said plurality of indicia when said lower frame member is in said first position relative to said upper frame member, the edge of the workpiece being in alignment with a second indicia of said plurality of indicia when said lower frame member is in said second position relative to said upper frame member.

9. The guide of claim 8, further comprising:
a pivot member for selectively allowing or preventing said lower frame member from pivoting relative to said upper frame member, said pivot member comprising said one of said legs of said plurality of legs of said upper frame member.

10. The guide of claim 8, said lower frame member having a vertical edge extending upwardly from said upper surface of said lower frame member, said vertical edge adapted to abut the edge of the workpiece.

11. The guide of claim 8, further comprising:
a spacer removably positioned on said upper surface of said lower frame member, said spacer adapted to raise the workpiece relative to said lower frame member.

* * * * *